Dec. 25, 1951 J. T. LANCASTER 2,579,936
HEELING MACHINE
Filed June 8, 1950 10 Sheets-Sheet 1

Inventor
John T. Lancaster
By his Attorney

Inventor
John T. Lancaster
By his Attorney

Dec. 25, 1951    J. T. LANCASTER    2,579,936
HEELING MACHINE
Filed June 8, 1950    10 Sheets-Sheet 3
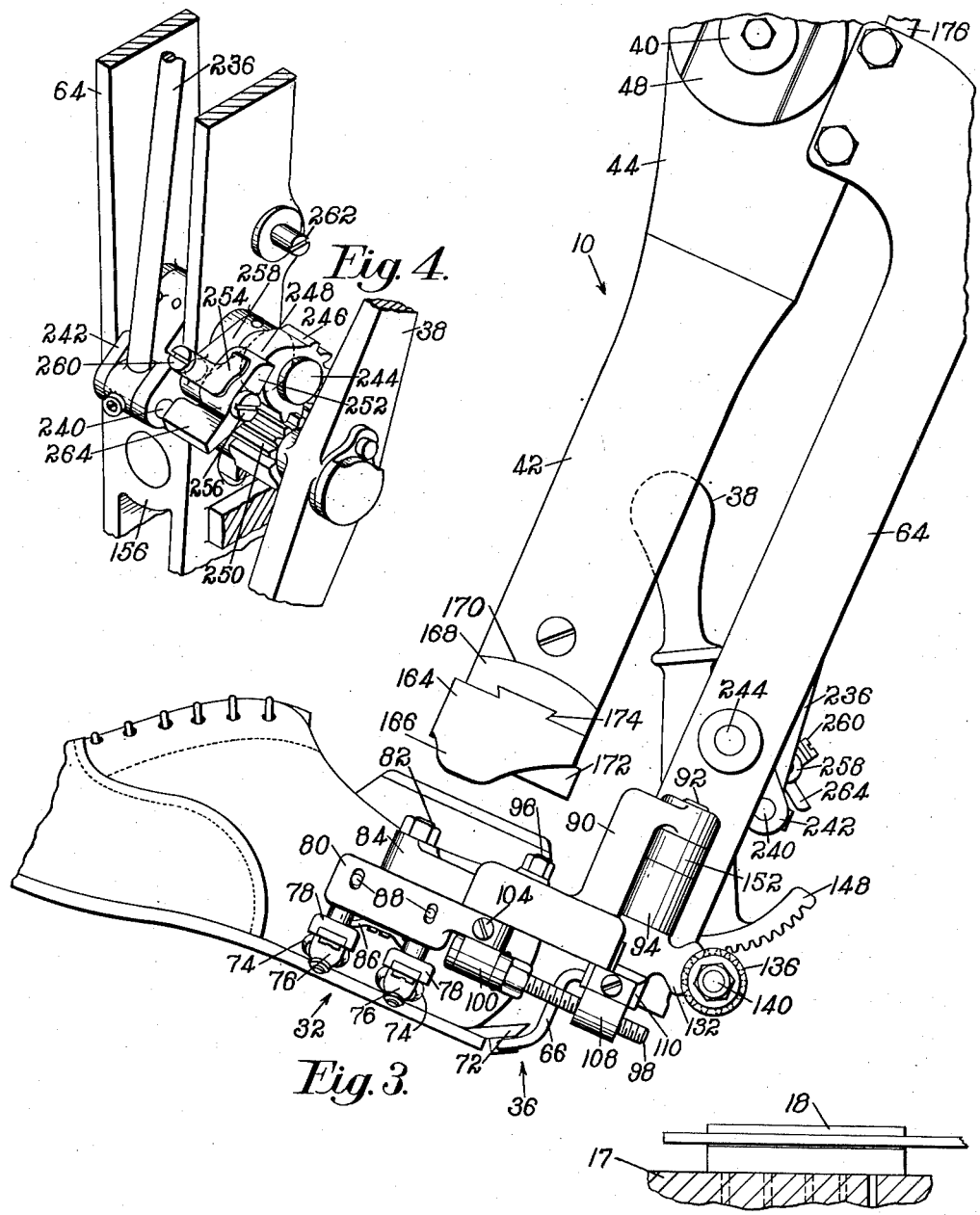
*Inventor*
John T. Lancaster
By his Attorney Dec. 25, 1951   J. T. LANCASTER   2,579,936
HEELING MACHINE
Filed June 8, 1950                          10 Sheets-Sheet 4

Inventor
John T. Lancaster
By his Attorney

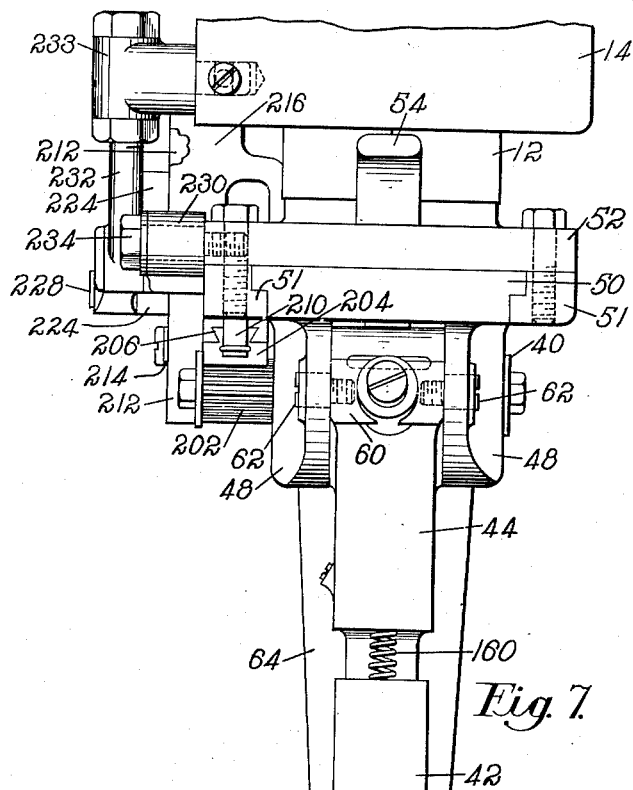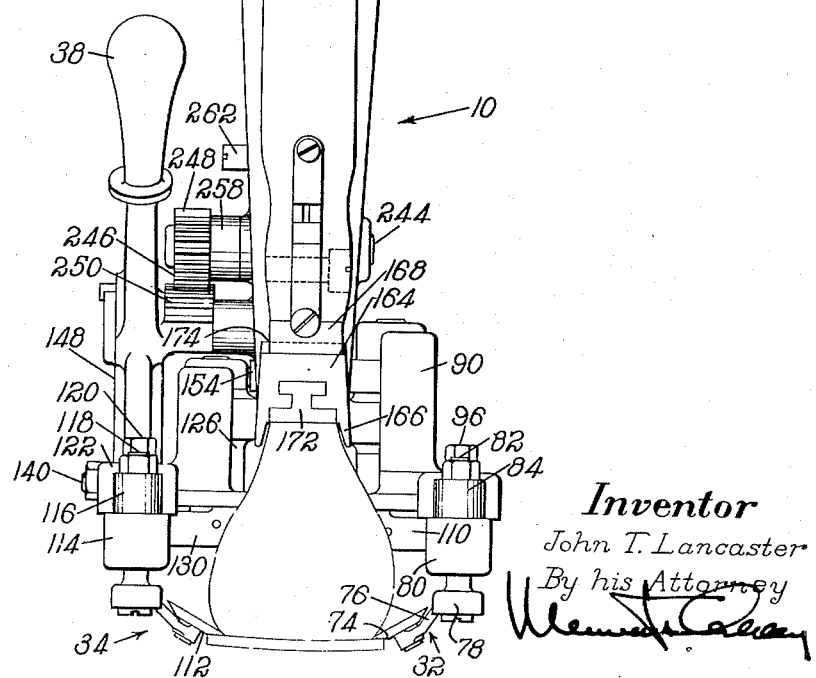
Fig. 7
Inventor
John T. Lancaster
By his Attorney

Dec. 25, 1951    J. T. LANCASTER    2,579,936
HEELING MACHINE
Filed June 8, 1950    10 Sheets-Sheet 7
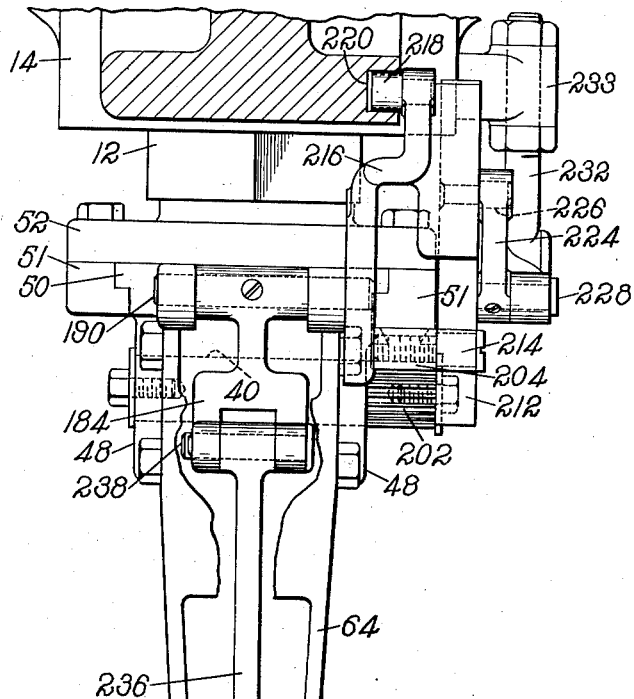
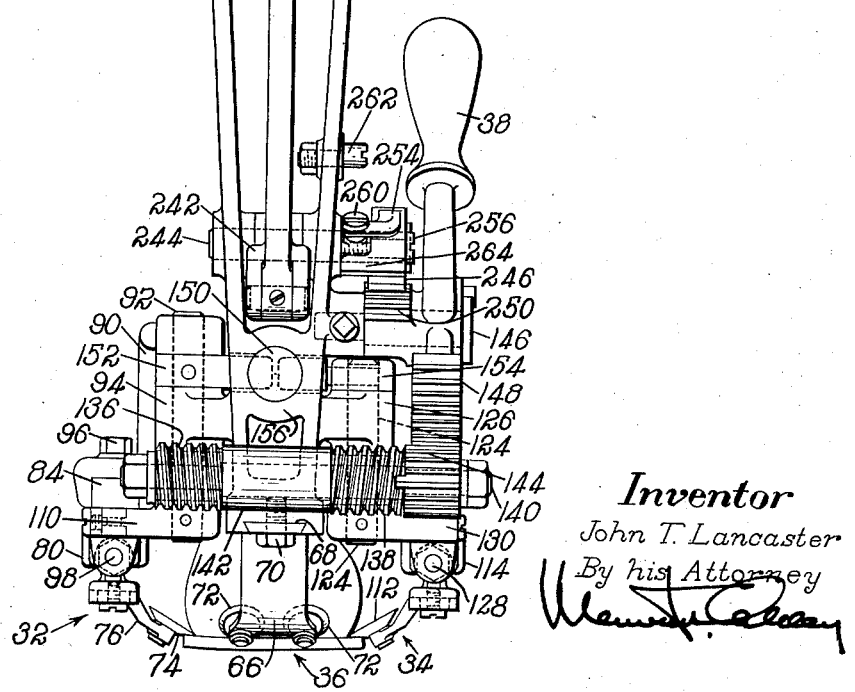
Fig. 8.
Inventor
John T. Lancaster
By his Attorney

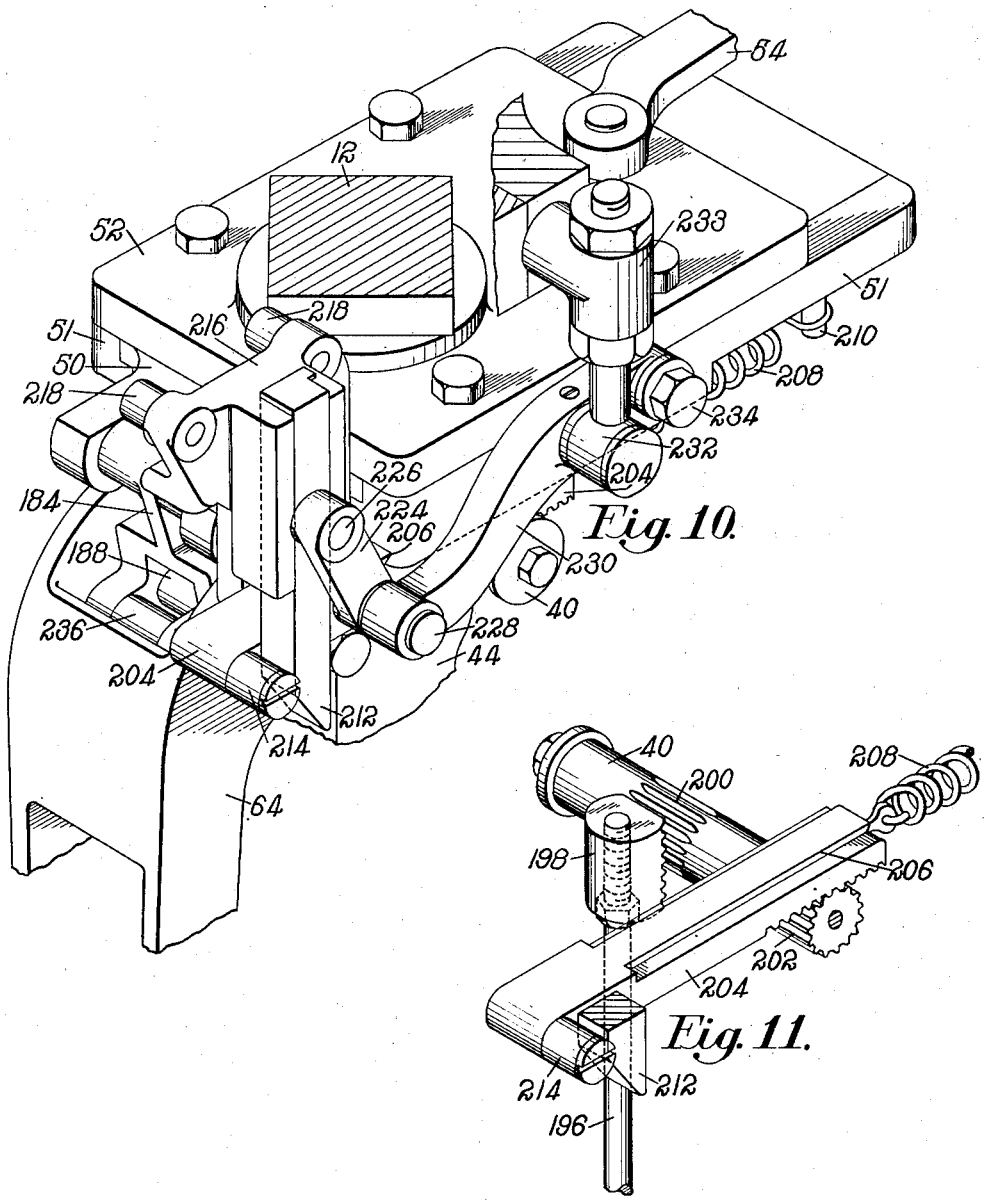

Dec. 25, 1951   J. T. LANCASTER   2,579,936
HEELING MACHINE

Filed June 8, 1950   10 Sheets—Sheet 10

*Inventor*
John T. Lancaster
By his Attorney

Patented Dec. 25, 1951

2,579,936

UNITED STATES PATENT OFFICE 2,579,936

HEELING MACHINES

John T. Lancaster, Newton, Mass., assignor to United Shoe Machinery Corporation, Flemington, N. J., a corporation of New Jersey Application June 8, 1950, Serial No. 166,869

16 Claims. (Cl. 1—32)

This invention relates to heeling machines, and more particularly to an improved shoe jacking mechanism which is illustrated herein as embodied in a heeling machine of the type disclosed in United States Letters Patent No. 1,157,688, granted on October 26, 1915, upon an application of L. L. Glidden.

In performing the usual heel attaching operation it is a common practice to position the shoe parts in register with each other by the use of a holder for the heel, or for the heel sections if the heel is composed of more than one part, together with a jack upon which the lasted shoe is mounted. As a result of relative movement of the jack and a support, usually a nailing die beneath the heel holder, a relatively light preliminary clamping pressure is first set up between the heel seat of the shoe and the upper surface of the heel, or heel section, to be applied to the shoe. Later in the heel attaching operation, a heavier pressure is applied to the work just before the fastening driving mechanism is operated to drive a number of fastenings, usually nails, through the heel into the heel seat.

It is desirable that the above-mentioned preliminary pressure shall not vary materially from shoe to shoe because it contributes to the amount of the final pressure, which should be neither too light to hold the work properly, nor so heavy as to crush the last.

In a machine of the Glidden type, the jack is moved to set up the preliminary clamping pressure by a sliding wedge mechanism which is actuated by a spring, and the amount of the preliminary pressure depends upon the stress in the spring when the mechanism comes to rest. Accordingly, the preliminary clamping pressure will vary with different heel thicknesses and different last heights unless the stroke of the jack is adjusted from one level to another to compensate for these variations. Such an adjustment has been provided in the Glidden machine. However, its effectiveness depends upon the attention and judgment given to its use by the operator.

In view of the foregoing, an important object of the invention is to provide a jack so constructed and arranged as to relieve a heeling machine operator from the close attention required in keeping the jack in proper adjustment, and further, to insure that a constant preliminary clamping pressure will be set up between the shoe and the heel regardless of variations in heel thickness or last height. A further object of the invention is to facilitate the heeling operation by insuring the desired state of register between the heel and the shoe, as well as the ready insertion of the work into, and its removal from the jack.

In the attainment of the former of these objects provision is made in the construction of the illustrated jack for holding a lasted shoe with its heel seat at a predetermined level on the jack, and with respect to the support for the heel, regardless of the size of the shoe or the height of the last. To this end, and in accordance with one feature of the invention, the illustrated jack comprises positioning devices constructed and arranged to engage the outside of the heel portion of the shoe at spaced points along the rand crease, the shoe being supported in this position against all pressures to be applied thereto by a holddown which is moved into engagement with the top of the last cone at whatever height it may be, and also is locked in this position before and throughout the period when the preliminary pressure, and any subsequent pressure, is exerted upon the last.

Invention is also to be recognized in the illustrated locking means for the holddown which includes, in accordance with another feature of the invention, mechanism operable in response to movements of the jack toward and away from the die or heel support for automatically setting and releasing the locking means, respectively.

In furtherance of the other objects of the invention mentioned above, the illustrated machine is provided with operating mechanism constructed and arranged, in accordance with another feature of the invention, to move the holddown into and out of engagement with the last cone, as well as, to separate the positioning devices from the shoe at the end of a heeling operation. The swinging movement of the jack between its operative and its inoperative or loading positions is utilized to effect these movements of the holddown and the positioning devices, whereby any need for the operator's giving any attention to these features of operation of the machine is avoided.

Other important features of the invention reside in the construction and arrangement of various parts of the positioning devices on account of which the lasted shoe is fixedly held in the jack with its heel seat in angular, lateral and longitudinal alinement with the heel or heel section to be applied to the shoe.

These and other features of the invention will now be described in greater detail with reference to the accompanying drawings, and will be defined in the claims.

In the drawings,

Fig. 3 is a side elevation illustrating the jack with its shoe positioning devices in operative relation to a lasted shoe;

Fig. 4 is a view in perspective of a part of the operating mechanism for the shoe positioning devices;

Fig. 7 is a front elevation of the structure shown in Fig. 5;

Fig. 8 is a rear elevation of the structure shown in Fig. 5;

Fig. 10 is a view in perspective of a part of the operating mechanism for the jack, as seen from the rear and from the left-hand side of the machine;

Fig. 11 is a view in perspective of a part of the mechanism for locking the holddown;

Figure 1:
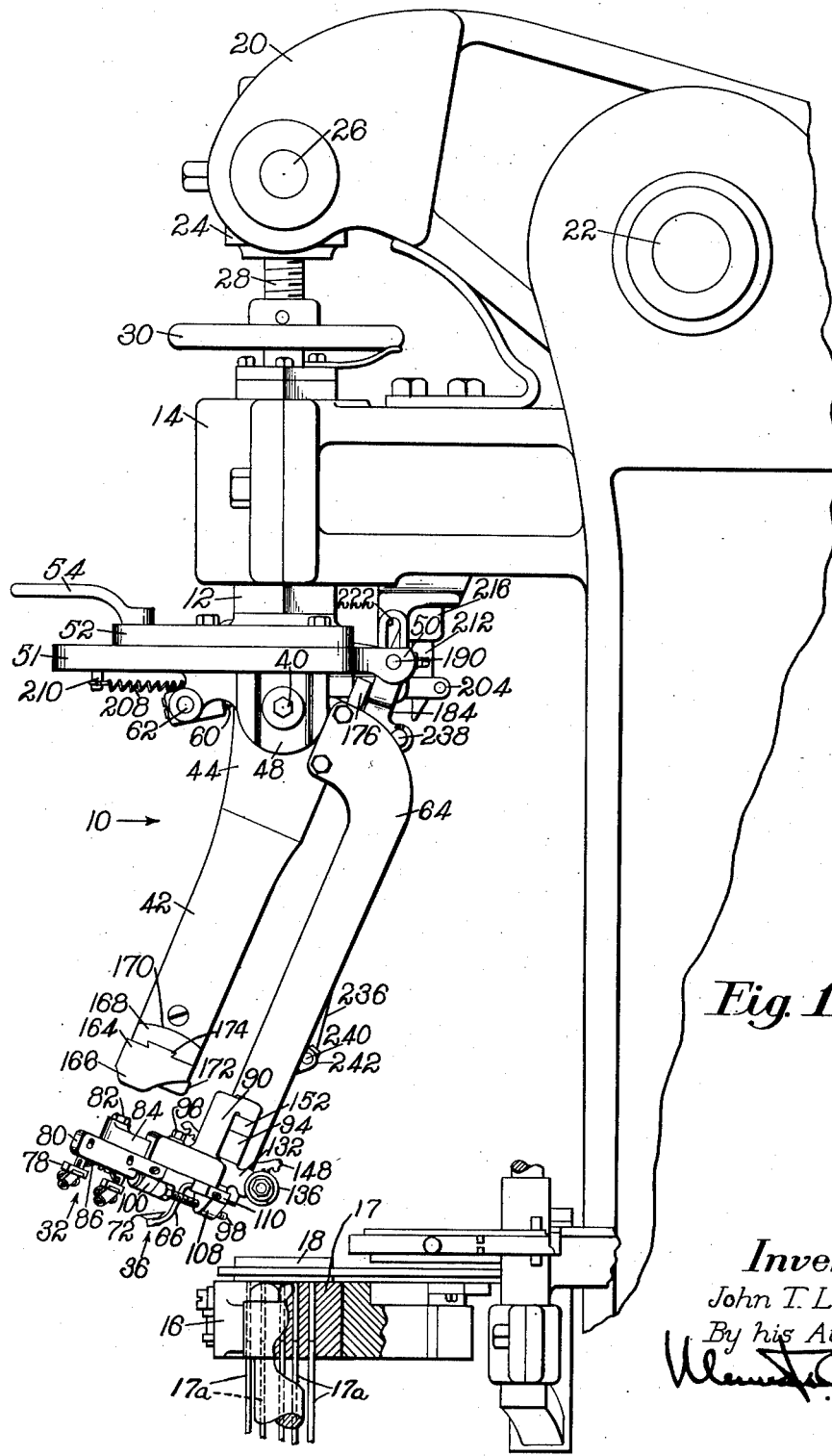
Fig. 1 is a side elevation of a portion of a heeling machine embodying a jack of the type provided by the invention.

Only those features of a typical heeling machine, such as that disclosed in the above-mentioned Glidden patent, as are necessary for an understanding of the construction and operation of the illustrated jack 10 will be referred to herein. Such old and well-known structure includes a reciprocating plunger 12 (Fig. 1) on the lower end of which the jack is mounted. The plunger is mounted to move vertically in a bearing 14, integral with the frame, toward and away from a fixed crosshead 16 carrying a support 17 for a heel section 18 which is to be applied to a shoe on the jack. The support 17, as illustrated herein, is a nailing die through which drivers 17a rise to drive fastenings through the heel section into the heel seat of the shoe. The jack and plunger are lowered to apply a preliminary clamping pressure to the work by a train of connections to the usual sliding wedge mechanism of the Glidden machine inluding a walking beam 20, pivoted at 22 to the frame, a trunnion block 24 pivoted at 26 to the walking beam, and a screw 28 which is threaded into the block 24 and is rotatably mounted upon the upper end of the plunger 12. As is well understood in this art, by turning a hand wheel 30 attached to the screw 28 the jack may be adjusted vertically to accommodate different last heights or heel thicknesses, so that the above-mentioned sliding wedge mechanism will cause the desired preliminary pressure to be applied to the work regardless of its size.

A lasted shoe is supported in the illustrated jack with its heel seat at a predetermined level by a pair of positioning devices 32, 34 (Figs. 1, 7 and 8), one at each side of the shoe, and another positioning device 36 (Figs. 3 and 6) adapted to engage the rear end of the shoe. With the jack in its inoperative position, as illustrated in Fig. 1, a lasted shoe is inserted into the jack so as to cause the positioning device 36 to engage the rear end of the shoe within the rand crease. Then, by pulling a handle 38 forwardly, into the position indicated in Fig. 3, the positioning devices 32, 34 are swung toward each other into engagement with the sides of the shoe within the rand crease, as shown in Figs. 7 and 8. As the thickness of soles varies very little, so far as having an effect upon the amount of the preliminary pressure is concerned, the heel seats of all shoes will be supported in the jack at substantially the same height.

Upon swinging the jack into its vertical operative position (Fig. 5) the heel seat of the shoe is brought directly over, and in register with, the heel section 18, the lasted shoe being positioned angularly by the positioning devices, as will be pointed out below, as well as laterally and longitudinally. During this swinging movement of the jack 10, which takes place about a shaft 40, a holddown 42 is lowered into engagement with the top of the last cone, and is rigidly locked in this position so as to support the lasted shoe positively against any clamping or nail-driving pressure applied to the heel seat.

Figure 6:
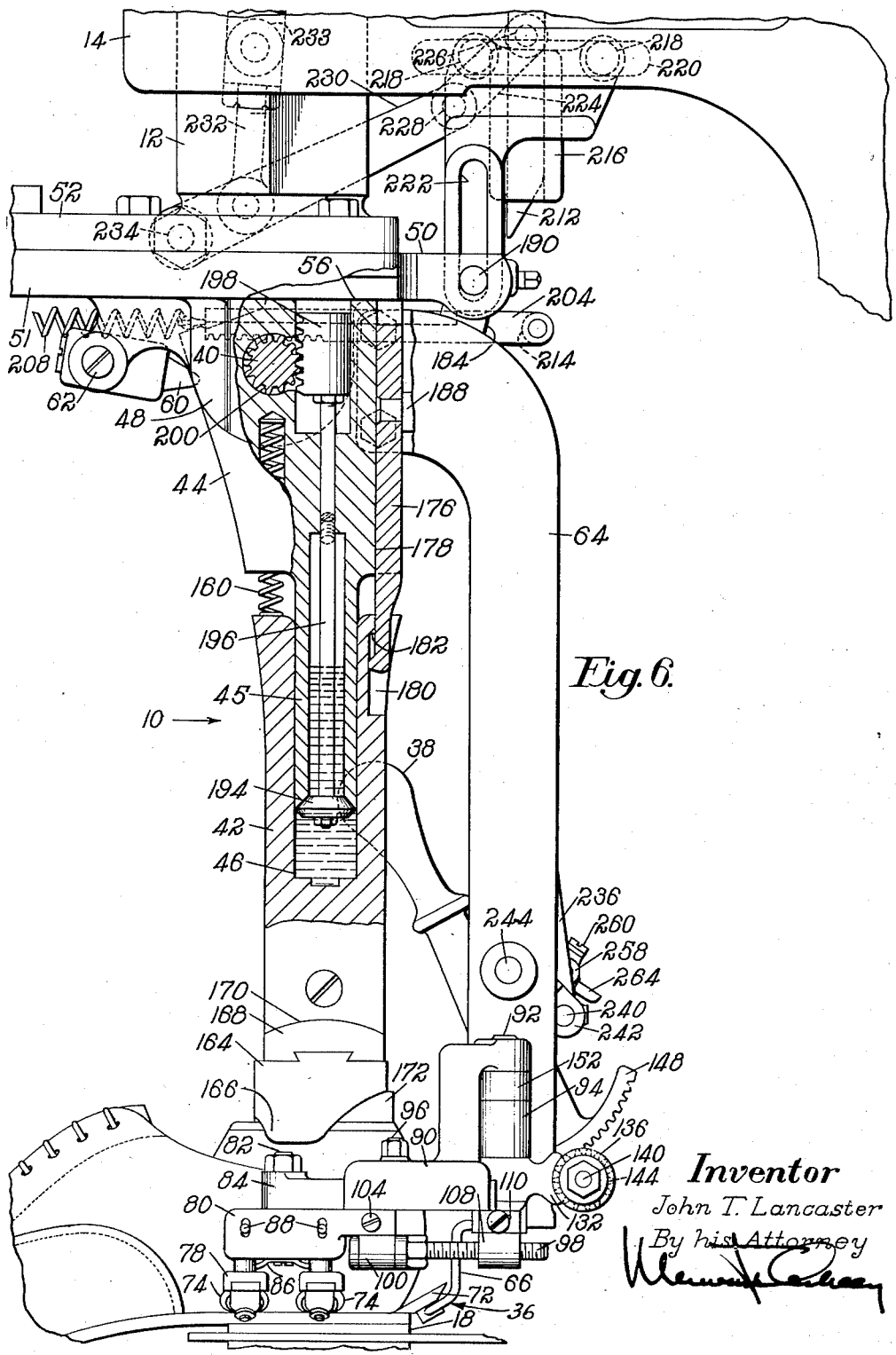
Fig. 6 is a sectional elevation illustrating the structure shown in Fig. 5, but with the holddown locked in engagement with the last, and the jack lowered to bring the shoe into engagement with the heel.

Preliminary clamping pressure between the heel section and the heel seat is now set up as a result of the jack being lowered, by the above-mentioned sliding wedge mechanism of the machine, to bring the heel seat of the shoe firmly against the heel section, as illustrated in Fig. 6. At a later predetermined time in the operating cycle of the machine, fastenings are driven through the heel section into the heel seat, the holddown positively supporting the shoe against the pressure exerted upon it during this operation.

The jack now is raised automatically, and finally is swung by the operator into its inoperative position. During the former movement of the jack the holddown 42 is unlocked, and during the latter movement the holddown is retracted away from the last simultaneously with the operation of mechanism arranged automatically to separate the positioning devices 32, 34 from the shoe, whereby its removal from the machine is facilitated. Having broadly outlined the use and purpose of the jack, its various features of construction and operation will now be described in detail.

Figure 2:
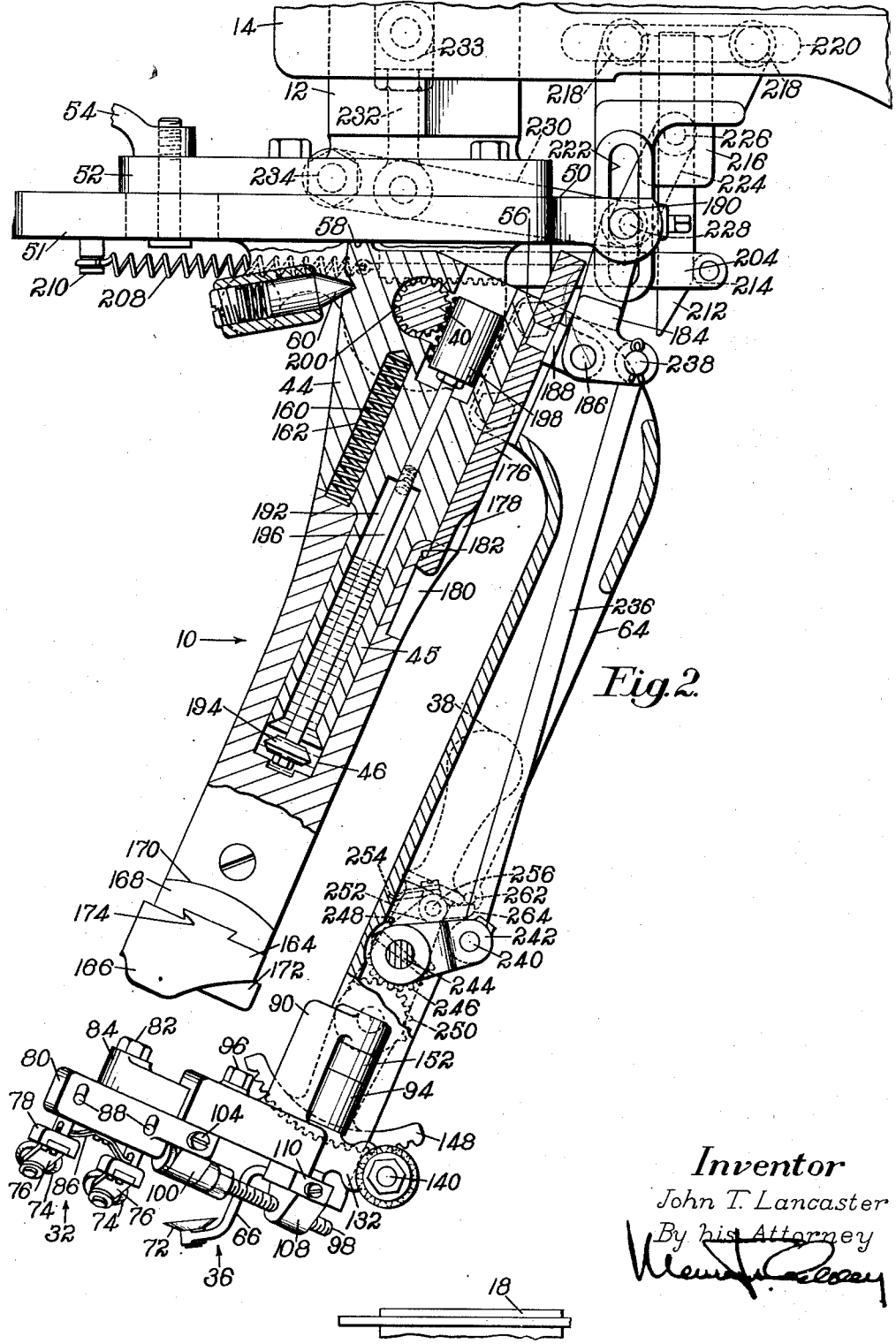
Fig. 2 is a sectional side elevation of the jack and its operating mechanism, the jack being in its inoperative position and in readiness to receive a lasted shoe to be operated upon.

The holddown 42 is telescopically mounted upon a post 44 (Figs. 2, 5 and 6), the lower part of which consists of a tube 45 which is received with a sliding fit within a bore 46 in the holddown. The post is rotatably mounted upon the shaft 40 which is mounted to turn freely in a pair of lugs 48 (Figs. 1 and 8) extending downwardly from a plate 50. The plate is mounted to slide forwardly and rearwardly of the machine between ways 51 secured to the bottom of a pad 52 on the lower end of the plunger 12. The plate may be secured in any desired position on the pad by means of a hand clamp 54. By this adjustment the jack may be positioned to cause a shoe therein to be alined, longitudinally thereof, with respect to the heel section 18. Swinging movement of the jack on the shaft 40 between its operative and inoperative positions is limited, and these positions are determined, by the engagement of shoulders 56, 58 (Figs. 2 and 5), respectively, with the lower surface of the plate 50, and the jack is yieldingly held in one position or the other by a spring-pressed detent unit 60 which is mounted to pivot upon studs 62 (Figs. 1 and 7) carried by webs extending forwardly from the lugs 48.

To the sides of the post 44 is fastened an arm 64 upon the lower end of which the positioning device 36 is mounted for adjustment lengthwise of the shoe. This positioning device comprises a plate 66 (Figs. 1 and 8) the upper end of which is formed to fit within a dovetail slot 68 made in the lower end of the arm 64. A screw 70 extending through an elongated slot in the plate and threaded into the arm secures the plate to the arm. Upon the lower end of the plate 66 are rotatably mounted two thin frusto-conical rolls 72, 72 which are shaped to fit within the rand crease of a shoe, and are so arranged as to lie slightly to each side of the center of the heel of a shoe in the jack.

The positioning device 32, comprises a pair of frusto-conical rolls 74, 74 which also are shaped and arranged to enter the rand crease of a shoe, and are rotatably mounted on a pair of arms 76, 76 (Fig. 2), each arm being mounted by a screw and slot connection for adjustment laterally of the shoe upon a carrier 78. Each carrier is mounted for limited vertical movement in a block 80 which is mounted to pivot freely, by means of a stud 82, upon the forward end of a slide 84. The carriers 78 are urged downwardly by a leaf spring 86 which is fixed to the lower side of the block 80, this movement of the carriers being limited by pins 88 which extend through vertically elongated slots in the block into the shanks of the carriers 78. This yielding mounting for the rolls 74 permits them to rise slightly in response to compression of the sole material or any slight flexing of the margins of the sole which may result from the clamping or nail driving pressure. Adjustment of the positioning device 32 lengthwise of the shoe is permitted by a slotted mounting of the slide 84 in an arm 90 which is mounted upon a rod 92 (Fig. 9) arranged to rotate freely within a bearing 94 which projects laterally from the arm 64. The slide 84 is fixed in any desired position of adjustment on the arm 90 by a T-headed bolt 96. The above described parts are so constructed and arranged that the rolls 74 and the roll 72 are at the same level when the pins 88 bottom in their slots in the block 80. Accordingly, the heel seat of the shoe will be supported parallel to the attaching surface of the heel section 18 when the jack is in its operative position.

The adjustment of the slide 84 is under the control of a screw 98 the head of which seats upon one end of a trunnion block 100, this block having a grooved shank 102 which is rotatably mounted in the block 80 and is retained therein by a screw 104. A nut 106 pinned to the screw 98 abuts the other end of the trunnion block 100, so that the screw may turn within the trunnion block without having any axial movement with respect thereto. The threaded portion of the screw 98 is received in another trunnion block 108 which is rotatably mounted in the outer end of an arm 110 pinned to the lower end of the rod 92.

The construction of and mounting for the positioning device 34 will not be described in great detail since the parts involved are either exactly like, or geometrically similar to, those described above in connection with the positioning device 32. However, the principal members of this assemblage comprise a pair of frusto-conical rolls 112, 112, similar to the rolls 74, 74, which are arranged to pivot with a block 114 with respect to a slide 116, upon a stud 118 which is similar to the stud 82. The slide 116 is adjustably secured by a T-bolt 120 to an arm 122, similar to the arm 90, which is mounted to swing on a rod 124, the latter being mounted to rotate freely in a bearing 126 projecting from the arm 64 opposite to the above-mentioned bearing 94.

The adjustment of the positioning device 34 lengthwise of the shoe is under the control of a screw 128. This screw, and an arm 130 fixed to the lower end of the rod 124, are the principal members of a train of connections similar to that described above which includes the screw 98 and the arm 110 respectively for adjusting the positioning device 32.

Provision is made for swinging the arms 90, 122 simultaneously in opposite directions, and at equal rates, so that the positioning devices, in being brought into engagement with the sides of the shoe, will center the shoe laterally in the jack. Connections are also provided between the positioning devices for insuring that any swinging movement of one upon the slide 84 or 116 will be accompanied by a similar swinging movement of the other, whereby the shoe will be also definitely positioned angularly in the jack.

Referring first to the mechanism for bodily moving the positioning devices into and out of engagement with the shoe, the arms 90 and 122 (Fig. 9) have worm gear segments 132, 134, respectively, extending rearwardly of the jack in mesh with worms 136, 138 which are fixed to a shaft 140. This shaft is mounted to rotate freely in a bearing 142 which projects rearwardly from the arm 64 and has a pinion 144 mounted upon one end thereof. The shaft 140 is rotated by the above-mentioned handle 38, which is rotatably mounted upon a stud 146 fixed in the arm 64, and has at its lower end a gear segment 148 in mesh with the pinion 144. It will now be understood that pulling the handle 38 forwardly will cause the positioning devices to be closed into engagement with the shoe. Similarly, rearward movement of the handle causes the positioning devices to be moved away from the shoe. The latter operation is effected automatically, as will be pointed out below.

Referring now to the means for equalizing the individual swinging movements of the positioning devices upon the studs 82 and 118, it will be observed that any swinging of these devices will cause a corresponding swinging movement of the rods 92, 124 because of the above-described connections including the adjusting screws 98 and 128. Such movements of the rods 92, 124 are equalized by connections including a plunger 150 and a pair of arms 152, 154, the latter being fixed to the upper ends of the rods 92, 124, respectively. The plunger 150 is arranged to slide freely in a bearing 156 at the lower end of the arm 64 and has a transverse bore 158 within which closely fit spherically-shaped end portions on the arms 152, 154. It will now be apparent that when the positioning devices are brought completely into engagement with the sides of a shoe, the shoe will be rigidly positioned angularly, because any tendency of the shoe to swing one of the positioning devices in either direction is opposed by the engagement of the other positioning device with the shoe.

At the beginning of an operating cycle of the machine the jack 10 is in its inoperative position, as illustrated in Fig. 1, the positioning devices 32, 34 having been separated to release the shoe previously operated upon. A lasted shoe to be operated upon is placed in the jack, as described above, against the positioning device 36, and the positioning devices 32, 34 are brought into engagement with the sides of the shoe within the rand crease by pulling the handle 38 forwardly into its position shown in Fig. 3. The jack is now swung about the shaft 40 to bring the heel seat of the shoe directly over a heel or heel section to be applied to the shoe. During this inward swinging movement of the jack, the holddown 42 drops under its own weight, and the added effect of a spring 160 (Fig. 5), as permitted by the hook 182, into engagement with the top of the last-cone. The spring 160 is received in a bore 162 in the post 44 and bears against the upper end of the holddown.

At the lower end of the holddown there is an abutment 164 (Figs. 2 and 7) having a pair of wings 166 arranged to overlie the sides of the last-cone. In order to permit the abutment to seat flatly upon the last-cone it is mounted upon a slide 168 which is arranged to tilt on an arcuate slideway 170, if either end of the abutment 164 first engages the last-cone. The abutment also comprises a sliding seat 172 which can be adjusted lengthwise of the last-cone so that the last will be supported directly over the heel seat. Dovetail connections at 174, between the abutment and slide 168, permit the abutment to be shifted laterally on the holddown into alinement with the last-cone.

The lowering movement of the holddown takes place gradually under the control of a hook 176 (Figs. 2, 5, 6 and 12) which is mounted to slide lengthwise of the post 44 in a slot 178 formed in the rear side thereof. The lower end of the hook 176 is received in a slot 180 formed in the holddown, there being a shoulder 182 near the upper end of the slot which is engaged by the hook. The hook is lowered and raised relatively to the post 44 in response to movement of the jack into and out of its operative position which is determined by the engagement of the shoulder 56 with the lower side of the plate 50. The mechanism for thus operating the hook comprises a bell crank 184 which is pivoted by means of a pin 186 to a stud 188, the latter being fixed to the hook 176. The upper arm of the bell crank is rotatably mounted upon the rear end of the plate 50 by means of a pin 190. It will now be evident that as the jack swings inwardly toward its operative position the hook 176 is lowered relatively to the post 44, permitting the holddown to slide on the tube 45 into engagement with the last-cone. Further lowering movement of the hook causes it to move away from the shoulder 182 into the clearance space provided by the slot 180.

The machine is now treadled to initiate a cycle of its operation during which the holddown, while in engagement with the last-cone is locked on the post against upward movement, the jack is lowered by downward movement of the plunger 12 to apply the preliminary clamping pressure between the heel section and the heel seat, the nail driving operation is performed, and finally, the jack is elevated to lift the shoe, with its attached heel, off the support or nailing die 17.

The downward movement of the jack is utilized to lock the holddown to the post, before the preliminary clamping pressure is applied, as will now be described with reference to Figs. 2, 5, 6 and 11. The bore 46 in the holddown and a bore 192 inside the tube 45 form a chamber adapted to hold a liquid, the level of which rises and falls in the tube as the holddown is raised and lowered. As the holddown is lowered into engagement with the top of the last-cone, the liquid flows out of the lower end of the tube 45 into the gradually lengthening bore 46. During the first part of the downward movement of the jack, a valve 194 is operated to close the lower end of the tube 45, whereby the liquid now in the bore 46 is trapped therein, and hence provides a positive support for the last against upward pressure. The valve is fixed to the lower end of a stem 196 to the upper end of which is attached a rack 198, these parts being arranged to slide lengthwise of the post so as to either close or open the end of the tube 45. The valve 194 is constantly urged toward its closed position by connections comprising the shaft 40 on which are formed two pinions 200, 202 (Fig. 11) which mesh with the rack 198 and a rack-bar 204, respectively. The latter is mounted to slide in dovetailed ways 206 (Fig. 7) which are formed in the way 51 at the lefthand side of the plate 50. The rack-bar 204 is spring-biased forwardly of the jack by a tension spring 208 which connects the forward end of the bar with a stud 210 extending downwardly from the left-hand way 51.

When the plunger 12 is in its raised position, the valve 194 is held open, against the tension of the spring 208, by a cam finger 212 which engages a roll 214 mounted on the rear end of the rack-bar 204, and holds the latter in its rearmost position. The cam finger 212 is mounted to slide vertically in a guide member 216 having a pair of roller studs 218 which are received in a slot 220 in the frame. The guide member 216 is adjusted in the slot 220, simultaneously with any adjustment of the plate 50, owing to the provision of a vertical slot 222 in the guide member which receives the left-hand end of the above-mentioned pin 190. Thus, adjustment of the plate 50 does not affect the operative relation between the cam finger 212 and the rack-bar 204.

When the plunger 12 drops, the cam finger 212 is quickly lifted free of the roll 214, whereby the valve is permitted to be closed under the influence of the spring 208. This operation of the cam finger is effected by mechanism comprising a link 224 which is pivoted at one end to a stud 226 carried by the cam finger, its other end being connected by a pin 228 to a lever 230. The lever is fulcrumed upon the lower end of a stud 232 which is fixed to a block 233 mounted to swivel on the frame of the machine. The lever is also arranged to swing upon a stud 234 which is threaded into the pad 52. It will now be evident, by comparison of Figs. 5 and 6 that downward movement of the plunger 12 will cause the rear end of the lever 230 to rise, and hence lift the cam finger 212 out of engagement with the roll 214, permitting the valve to be closed abruptly before the heel seat of the shoe engages the heel section. Similarly, when the plunger 12 is raised, after the completion of a heel attaching operation, the cam finger 212 is quickly lowered into engagement with the roll 214, whereby the rack-bar 204 is moved into its rearward position and the valve 194 is opened.

After the plunger 12 has stopped rising, the operator then swings the jack 10 forwardly into its inoperative position. This swinging movement of the jack causes the hook 176 to rise relatively to the post 44, and hence to lift the holddown 42 off the last. At the same time the handle 38 is automatically swung forwardly to cause the positioning devices 32, 34 to be moved away from the shoe. The mechanism for thus operating the positioning devices will now be described.

A link 236 (Figs. 2, 4, 5, 8 and 12) is connected at its upper end by a pin 238 to the above-mentioned bell crank 184, and the lower end of the link is connected by a pin 240 to an arm 242 which is fixed to a shaft 244. This shaft is mounted to rotate freely in the arm 64, and upon its lefthand end there is mounted, for free rotation, a gear 246 having a single rachet tooth 248. The gear 246 meshes with another gear 250 which is integral with the hub of the handle 38. When the jack is in its operative position, and the positioning devices are closed against a shoe in the jack, a pawl 252 lies in driving engagement with the rachet tooth 248 (Fig. 4), and is yieldingly held there by a spring 254. This pawl is rotatably mounted upon a screw 256 which is threaded into an arm 258, the arm being pinned to the above-mentioned shaft 244 adjacent to the gear 246. The spring 254 is fastened to the arm 258 by a screw 260. It will now be evident, with reference to Figs. 5 and 2, that when the jack 10 is swung toward its inoperative position, the link 236 will be lifted relatively to the arm 64, causing the pawl 252 to drive the gear 246 in such a direction as to move the handle 38 forwardly, and to open the positioning devices. Just as the jack reaches its inoperative position a pin 262, fixed to one side of the arm 64, is engaged by a tail 264 on the pawl, causing the latter to be lifted and held out of engagement with the tooth 248. Thus, the operator is permitted to close the positioning devices against the next shoe to be operated upon without interference from the pawl.

The adjustment and operation of the illustrated jack 10 will now be briefly summarized.

Figure 5:
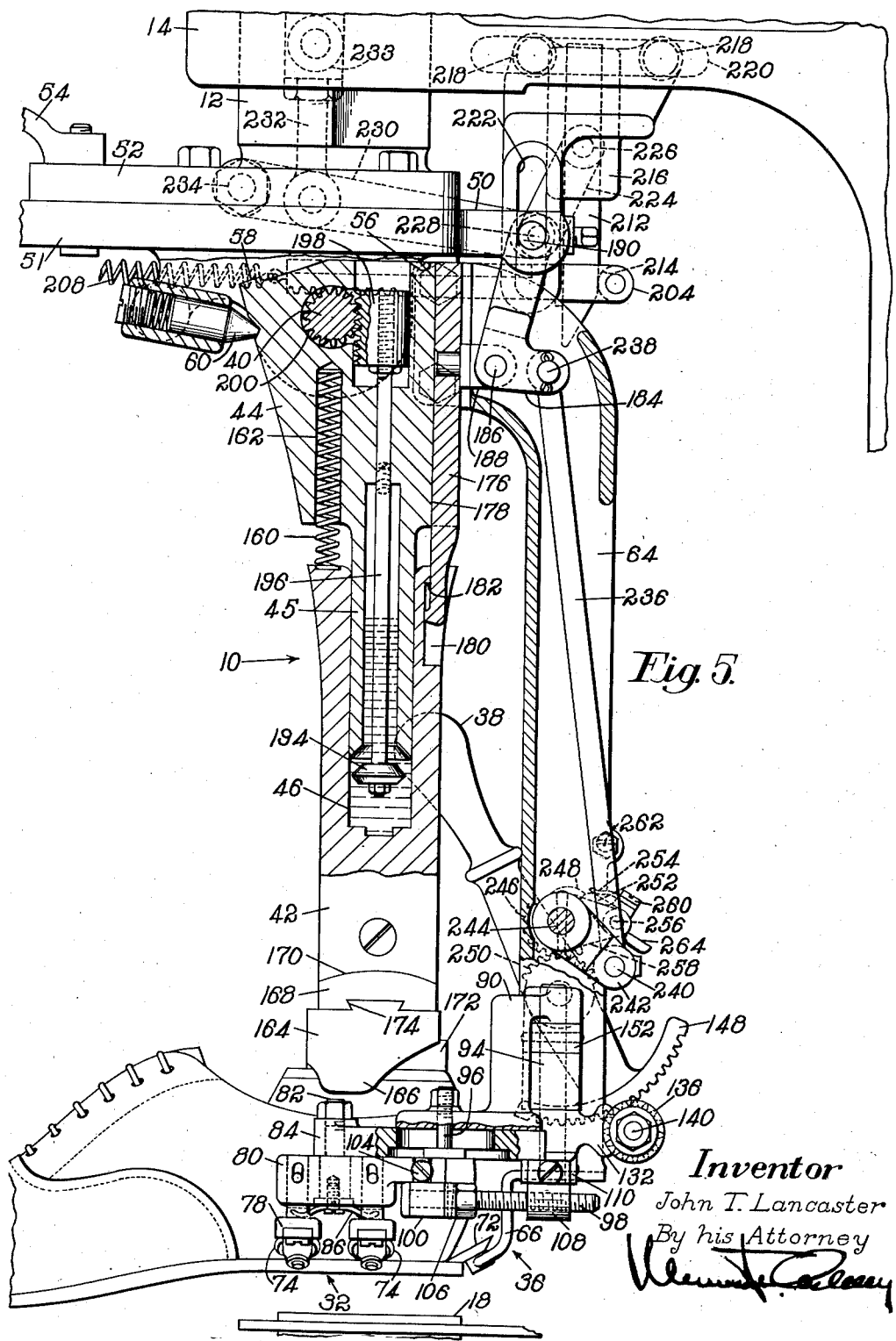
Fig. 5 is a sectional side elevation of the structure shown in Fig. 2, the jack having been swung to bring the heel seat of the shoe over the heel to be applied thereto, and to cause the holddown to engage the last cone.
Figure 9:
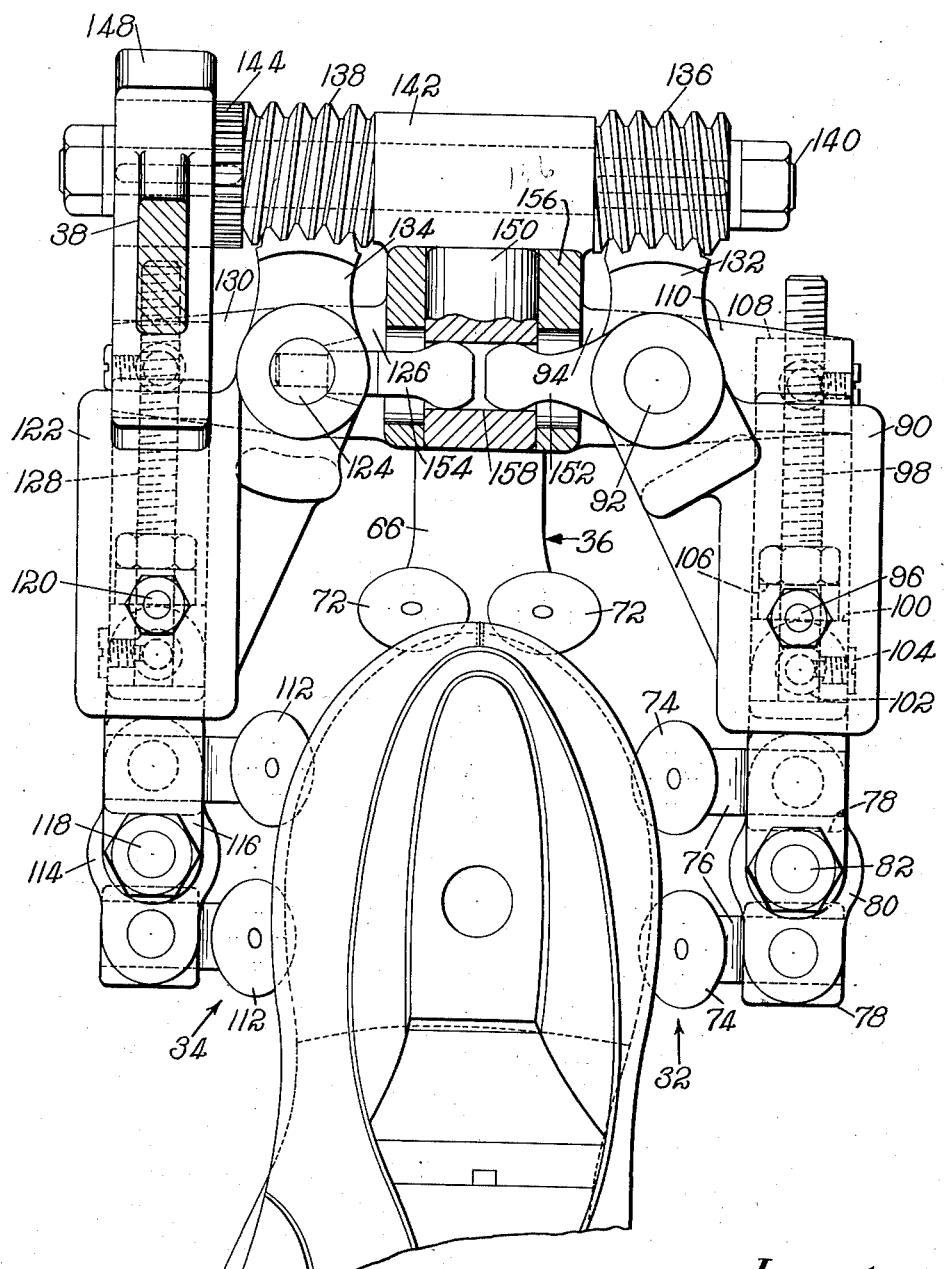
Fig. 9 is a sectional plan view of the shoe positioning devices, and a part of their operating mechanism.
Figure 12:
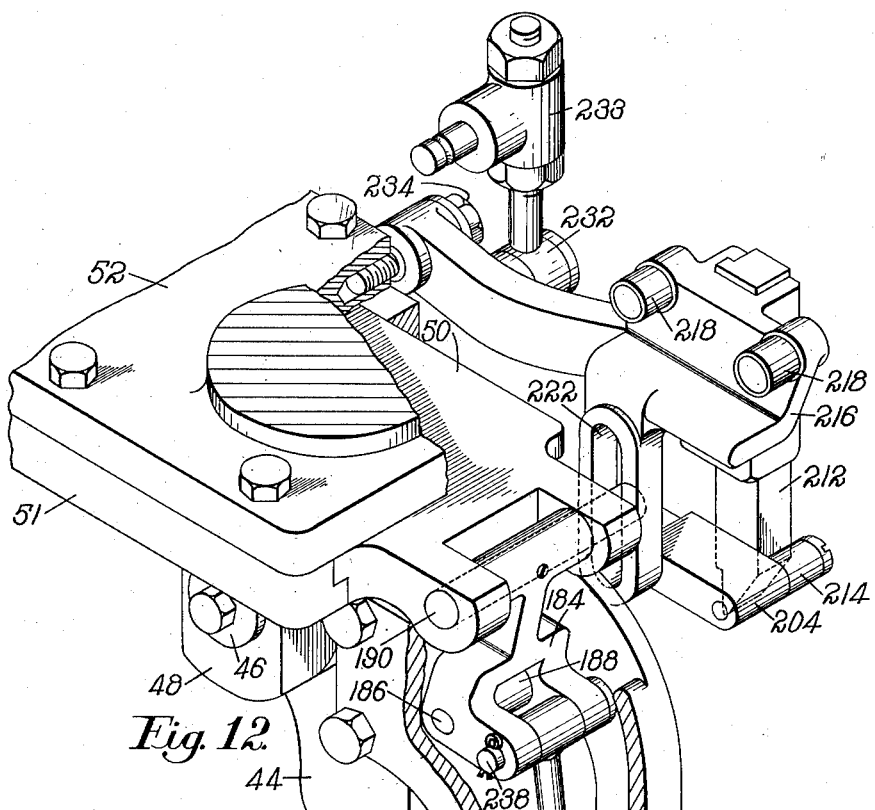
Fig. 12 is a view in perspective of the structure shown in Fig. 10, but as viewed from the rear and from the right-hand side of the machine.
Figure 13:
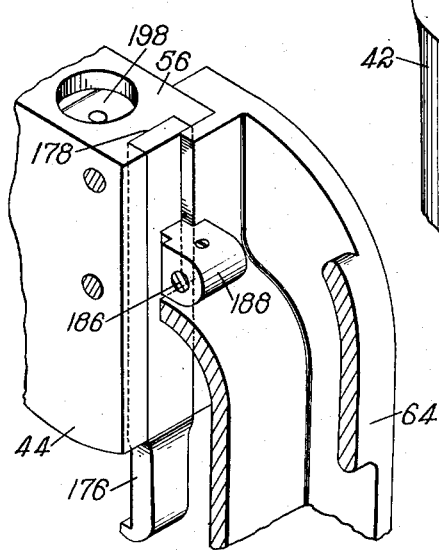
Fig. 13 is a perspective view showing portions of the jack, and the mechanism for controlling the holddown.

With the jack in its vertical position, the plunger 12 being in its upper position, a lasted shoe is presented to the jack with its heel end engaging the positioning device 36, as illustrated in Figs. 5 and 9. The rolls 72, 72 engage the shoe within the rand crease at substantially equal distances from the center of the heel end of the shoe. At this time also, the plate 66 may be adjusted on the lower end of the arm 64 so that the top of the last-cone will be in the desired relation to the seat 172 at the bottom of the holddown. After releasing the hand clamp 54, the operator may now bodily slide the plate 50 either forwardly or rearwardly of the machine in order to bring the heel end of the shoe into longitudinal alinement with the section 18 to be applied to the shoe. This adjustment of the plate 50 does not alter the operative relation between the cam finger 212 and the rack-bar 204 because, as pointed out above, the guide member 216 for the cam finger is moved by, and with, the plate 50 whenever it is adjusted.

After loosening the bolts 96, 120, for purposes of adjusting the positioning devices 32, 34, the handle 38 is now moved rearwardly to cause the positioning devices to be swung into proximity or engagement with the sides of the shoe within the rand crease. The adjusting screws 98, 128 are now turned to move the positioning devices forwardly or rearwardly of the shoe to bring the forward rolls 74, 112 slightly ahead of the point where the heel part of the shoe is the widest, and the rearward rolls substantially the same distance behind the same point. The bolts 96, 120 are now set up, and, holding the blocks 80, 114 in a symmetrical arrangement, as nearly directly fore-and-aft of the machine as possible, the arms 76 (and the corresponding arms of the positioning device 34) are fixed upon the carrier 78 so that the forward and rearward rolls of both positioning devices bear uniformly against the sides of the shoe within the rand crease. It is further to be noted that the construction and mounting of all the positioning devices is such that, when the jack is in its vertical position, the heel seat of the shoe is substantially parallel to the attaching surface of the heel or heel section 18. Accordingly, when the jack is lowered to bring the lasted shoe into engagement with the heel, these shoe parts will seat flatly on each other, and in register with each other.

Having adjusted the positioning devices in the above manner, the jack is moved into its inoperative or loading position, as illustrated in Fig. 1, in readiness to receive a shoe to be heeled. The handle 38 is in its rearward position, the positioning devices 32, 34 are in their open positions, and the holddown 42 is in its elevated position upon the post 44.

A lasted shoe is now presented to the jack so that the positioning device 66 engages the rear end of the shoe, as described above. The handle 38 is next pulled forwardly by the operator to cause the positioning devices 32, 34 to be swung into engagement with the sides of the shoe, the rolls 74 and 112 being arranged to enter the rand crease of the shoe at each side thereof, and at each side of the widest portion of the heel part, so that the shoe is firmly held within the jack against displacement in any direction. The operator then swings the jack into its vertical position to bring the heel seat of the shoe directly over the heel section 18. In response to this motion of the jack, the hook 176 is lowered to permit the holddown 42 to slide downwardly upon the tube 45 into engagement with the last-cone at whatever height the later may be.

The machine is now treadled to initiate a cycle of its operation. The plunger 12 is now lowered by the above-mentioned sliding wedge mechanism to cause the heel seat of the shoe to engage the heel section 18 with a preliminary clamping pressure. However, before such engagement between the heel and heel seat occurs, and in response to downward movement of the plunger 12, the cam finger 212 is abruptly lifted away from the roll 214 on the rack-bar 204. The spring 208 is thus permitted to pull the rack-bar forwardly, whereby the hydraulic locking means, including the valve 194, is automatically set. The liquid within the bore 76 is thus trapped therein, and being incompressible, provides a positive support for the last against any upwardly directed pressure.

At a predetermined time in the operating cycle, fastenings, such as nails, are driven from the nailing die 17 through the heel section 18 into the heel seat, the lasted shoe being rigidly supported against the final clamping and driving pressures by the positively acting hydraulic locking means for the holddown. After the driving operation is completed, the plunger 12 rises returning the jack to its elevated vertical position. In response to this movement of the plunger 12, the cam finger 212 is suddenly lowered to release the hydraulic locking means, that is, the valve 194 is moved out of engagement with its seat on the end of the tube 45. The jack is now swung by the operator into the loading or inoperative position, and in response to this movement, the hook 176 and the link 236 are raised relatively to the arm 64 by the bell crank 184, whereby the holddown 42 is lifted off the last-cone simultaneously with the rearward swinging of the handle 38 which causes the positioning devices 32, 34 to be moved away from each other out of engagement with the shoe. It is understood that the operator will have grasped the shoe before it will have been released from the jack, and that the shoe is removed from the jack immediately after the positioning devices cease to hold the shoe.

At the end of the rearward movement of the handle 38, the tail 264 of the pawl 252 engages the pin 262 causing the pawl to be swung out of driving engagement with the ratchet tooth 248. The driving means for opening the positioning devices is therefore ineffective, at this time, to prevent the operator from moving the handle 38 forwardly to cause the succeeding shoe to be operated upon to be positioned in the jack.

Having thus described my invention what I claim as new and desire to secure by Letters Patent of the United States is:

1. A heeling machine having a nailing die, a jack movable toward said die to cause the heel seat of a lasted shoe on said jack to be pressed against a heel section supported by said die, shoe supporting means on said jack constructed and arranged to position the shoe with its heel seat at a predetermined level with respect to said jack, a holddown mounted for movement into and out of engagement with the cone of the last, locking means for securing said holddown in engagement with the last cone, and means constructed and arranged to set and release said locking means in response to the movements of said jack toward and away from said die respectively.

2. A heeling machine having a nailing die, a jack movable toward and away from said die to cause the heel seat of a lasted shoe on said jack to be pressed against a heel section supported by said die, said jack being constructed to hold the lasted shoe with its heel seat at a predetermined level by engagement with the sides of the shoe within the rand crease, a holddown mounted upon said jack to slide into and out of engagement with the cone of the last, and means operable in response to movement of said jack toward said die to lock said holddown while in engagement with the last cone against movement away therefrom.

3. A heeling machine having pressure applying mechanism including a jack for holding a lasted shoe and a support for a heel section to be attached to the shoe, said jack being movable toward and away from the support to press the heel seat of the shoe against the heel section, said jack comprising a post on which a holddown is telescopically mounted to slide into engagement with the last cone, said post and holddown being constructed and arranged to enclose a liquid retaining chamber the volume of which is varied by movement of said holddown, a valve for controlling the flow of liquid into and out of said chamber, and means operated in response to movement of said jack toward and away from said support to close and open said valve respectively.

4. A heeling machine having pressure applying mechanism including a jack for holding a lasted shoe and a support for a heel section to be attached to the shoe, said jack being movable toward and away from the support to press the heel seat of the shoe against the heel section, said jack comprising a post on which a holddown is telescopically mounted to slide into engagement with the last cone, said post and holddown being constructed and arranged to enclose a liquid retaining chamber the volume of which is varied by movement of said holddown, a valve for controlling the flow of liquid into and out of said chamber, means operable in one direction to urge said valve toward its closed position, and mechanism actuated by movement of said jack away from said support for operating said means in the opposite direction thereby to open said valve.

5. A heel attaching machine having pressure applying mechanism comprising a jack for a lasted shoe and a support for a heel section to be attached to the shoe, a plunger upon which said jack is mounted to swing between a loading position and an operative position wherein the heel seat of the shoe is opposite to the support, said plunger being mounted for movement toward and away from said support to cause the lasted shoe to be pressed against the heel section, said jack comprising a holddown which is movable into engagement with the cone of the last, means for locking said holddown while in engagement with the last cone against movement away therefrom, means operable in response to the movements of said plunger toward and away from said support for setting and releasing said locking means respectively, and means actuated by swinging movement of said jack out of its operative position for retracting said holddown off the last cone.

6. A heeling machine having a nailing die, a jack movable toward and away from said die to press the heel seat of a lasted shoe on said jack against a heel section supported by said die, said jack having means for supporting the shoe by engagement with its sides within the rand crease and with its heel seat in register with the heel section, said jack also being movable between a loading position and an operative position opposite to said die, a holddown mounted for movement into and out of engagement with the cone of the last, means operated by the movements of said jack into and out of its operative position for lowering and raising said holddown into and out of engagement with the last cone respectively, locking means for securing said holddown in engagement with the last cone, and means for setting and releasing said locking means in response to the movements of said jack toward and away from said die respectively.

7. A heeling machine having a pressure applying mechanism including a jack for holding a lasted shoe and a support for a heel section to be attached to the shoe, shoe supporting means on said jack constructed and arranged to engage the outside of the heel portion of the shoe at spaced points along the rand crease, a holddown mounted to swing between an operative position opposite to said support and an inoperative position, means for yieldingly moving said holddown into engagement with the last cone, and mechanism acting in opposition to said means in response to swinging movement of said holddown away from its operative position to retract said holddown away from the last cone.

8. A heeling machine having a nailing die, a jack for holding a lasted shoe mounted for movement toward and away from the die to press the heel seat of the shoe against a heel section supported by the die, said jack being movable between an operative position opposite to the die and an inoperative position, said jack having opposed positioning devices movable laterally of the heel portion of the shoe into and out of engagement therewith at spaced points along the rand crease, operator controlled means operable in one direction to close said positioning devices against the shoe, a holddown movable into and out of engagement with the last cone, and connections operated in response to movement of the jack toward its inoperative position for simultaneously reversing the above-mentioned movement of said operator controlled means to separate said positioning devices from the shoe and moving said holddown away from the last cone.

9. A heeling machine having pressure applying mechanism including a nailing die and a jack mounted for movement between an operative position over said die and an inoperative position, said jack having opposed shoe positioning devices adapted to support a shoe in a predetermined relation to said die by engagement within the rand crease of the shoe at each side thereof, said devices being mounted for equal and opposite movement into and out of engagement with the shoe, and means constructed and arranged to move said devices away from the shoe in response to movement of said jack into its inoperative position.

10. A heeling machine having pressure applying mechanism including a nailing die and a jack mounted for movement between an operative position over said die and an inoperative position, said jack having shoe positioning devices movable toward and away from each other and adapted to support a shoe in a predetermined relation to said die by engagement within its rand crease at each side thereof, means for separating and closing said devices from and against the shoe respectively, and operating mechanism cooperating with said means to separate said devices from the shoe in response to movement of said jack toward its inoperative position.

11. In a heeling machine having pressure applying mechanism including a nailing die and a jack mounted to swing into and out of operative position over said die, opposed shoe positioning devices constructed and arranged to position a shoe in a predetermined relation to the nailing die, said devices being mounted upon the jack for equal and opposite movement into engagement with the sides of the shoe within its rand crease, controlling means actuated by movement of the jack into its inoperative position for separating said devices from the shoe, and means for rendering said controlling means inoperative at the end of the movement of said jack into its inoperative position whereby said devices may be closed into engagement with the succeeding shoe to be jacked.

12. In a heeling machine having pressure applying mechanism including a nailing die and jack mounted for movement between an operative position over said die and an inoperative position, said jack having shoe positioning devices movable toward and away from each other and adapted to support a shoe by engagement within its rand crease at each side thereof, operator controlled means for closing said devices against the shoe, operating mechanism cooperating with said operator controlled means to separate said devices from the shoe in response to swinging movement of said jack toward its inoperative position, and means for disconnecting said operating mechanism from said operator controlled means when said jack is in its inoperative position thereby to permit said devices to be closed against the shoe by said operator controlled means.

13. In a heeling machine having pressure applying mechanism including a nailing die and a jack mounted to swing into and out of operative position over the die, the jack having opposed shoe positioning devices movable toward and away from each other and adapted to support a shoe by engagement within its rand crease at each side thereof, means for separating and closing said devices from and against the shoe respectively, said means including a pawl and ratchet disposed in driving relation when the jack is in its operative position, and means operable in response to movement of the jack into its inoperative position to disengage said pawl and ratchet whereby said devices may be closed into engagement with the succeeding shoe to be jacked.

14. A heeling machine having pressure applying mechanism including a nailing die and a jack mounted for movement between an operative position opposite to said die and an inoperative position, said jack having opposed positioning devices arranged to engage each side of the heel portion of a lasted shoe within its rand crease, said devices being mounted to move equally in opposite directions bodily toward and away from each other, each of said devices comprising a pair of spaced abutments mounted to swing together into engagement with the shoe, and connections between said devices for causing swinging movement of one pair of said abutments to be imparted equally to the other pair in the opposite direction.

15. A heeling machine having pressure applying mechanism comprising a jack for a lasted shoe and a support for a heel section to be attached to the shoe, said jack having a plurality of positioning devices arranged to hold a shoe by engagement with its sides at spaced points along the rand crease, one of said positioning devices being fixed to said jack and adapted to engage the shoe at its heel end, a pair of arms mounted upon said jack to swing equally in opposite directions, a slide mounted in each of said arms for adjustment lengthwise thereof, each of said arms having one of said positioning devices rotatably mounted thereon and connections between said positioning devices on said arms for causing their swinging movement to occur equally in opposite directions.

16. A heeling machine having pressure applying mechanism comprising a jack for a lasted shoe mounted to swing into and out of operative relation with respect to a support for a heel section to be attached to the shoe, said jack having a plurality of positioning devices, one at each side of the shoe and one at the rear end thereof, said devices being shaped and arranged to engage the shoe at spaced points within the rand crease, a pair of arms mounted on said jack to swing laterally of the shoe, a slide mounted upon each of said arms for adjustment lengthwise thereof, each of said arms having one of said positioning devices mounted thereon, operator controlled means operable in one direction to move said arms toward each other to bring the positioning devices on said slides into engagement with the sides of the shoe, and mechanism constructed and arranged to operate said operator controlled means in the opposite direction in response to swinging movement of said jack out of its operative position to retract said positioning devices from the shoe.

JOHN T. LANCASTER.

REFERENCES CITED

The following references are of record in the file of this patent:

UNITED STATES PATENTS

| Number | Name | Date |
|---|---|---|
| 674,806 | Woods | May 21, 1901 |